Nov. 28, 1967  V. C. SMITH  3,355,018
DEMINERALIZATION OF WATER
Filed Dec. 18, 1964

*INVENTOR.*
VERITY C. SMITH
BY
*Kenway, Jenney & Hildreth*

ATTORNEYS

United States Patent Office 3,355,018
Patented Nov. 28, 1967

3,355,018
DEMINERALIZATION OF WATER
Verity C. Smith, Dedham, Mass., assignor to Barnstead Still and Sterilizer Co., Boston, Mass., a corporation of Massachusetts
Filed Dec. 18, 1964, Ser. No. 419,530
6 Claims. (Cl. 210—94)

This invention relates to the demineralization of water by ion exchange, and more particularly to the use of ion exchange resins containing a pH sensitive dye to indicate the end point at which significant quantities of electrolytes appear in the effluent water.

The use of ion exchange systems for removing dissolved electrolytes from water is well known. Generally the process consists of contacting the water with a cation exchange resin in the hydrogen form and an anion exchange resin in the hydroxyl form, whereby metallic cations in the water are exchanged for hydrogen ions and acid forming anions are exchanged for hydroxyl ions. The result is the removal of dissolved salt and its replacement by hydrogen and hydroxyl ions which combine to form pure water.

Commonly, demineralization by ion exchange is carried out by flowing the water to be treated through a column containing a bed of the resins, either mixed together or in separate layers, and collecting purified water at the downstream end of the column. Purification takes place until the point is reached when electrolyte begins to appear in the effluent, indicating that so much of the hydrogen and/or hydroxyl ions have been removed that further replacement by them of electrolyte ions in the water cannot take place. In industrial and large scale operations the end point is conveniently determined by measuring the electrical resistivity of the effluent, as pure water will have a high resistivity of up to $18 \times 10^6$ ohms/cm. while water containing only 10 p.p.m. of sodium chloride will have a resistivity of only 50,000 ohms/cm.

In small scale operations, such as small laboratory or household units, constant electrical monitoring of the effluent is inconvenient or impractical. For these purposes it is common practice to use ion exchange resins which have been dyed with a color indicator, and which change color either when the cation exchange resin becomes of high pH, indicating its loss of hydrogen ions, or when the anion exchange resin becomes of low pH from loss of hydroxyl ions. In past practice, it has been considered that it is the condition of the resin at the effluent end of the bed that is significant, and that until the lowermost reaches of resin have changed color, indicating thorough exhaustion, the bed is still effective for demineralization.

Contrary to this view, however, it has now been found that electrolyte will frequently appear in the effluent long before the lowermost quantity of resin has changed color, and frequently even before the uppermost portions of resin have changed color. The latter effect can, however, be avoided by specially arranging beds of anion exchange resins of different basic strengths downstream from the dyed cation resin to bring about some color change in the latter.

In the present invention the end point is determined by the color change of a dyed resin, which is localized well upstream from the effluent end of the bed, preferably near the inlet end, so that its change in color will more effectively indicate the point that electrolytic impurities appear in the effluent. In another aspect, the ion exchange system of this invention includes, in downstream order, a weakly basic anion exchange resin bed followed, mediately or immediately, by a strongly basic anion exchange resin bed. This has been found to give a sharper color change end point in the cation exchange resin bed and also to provide for greater demineralization capacity than when the weakly basic anion exchange bed is replaced by one strongly basic.

Embodiments of this invention are described below, with reference to the accompanying drawing in which.

Each of the illustrated embodiments consists of a conventional ion exchange column 10, conveniently a glass tube, having an inlet 12 at the top and an outlet 14 at the bottom, by which water may be run through and in contact with a quantity of ion exchange resin in the column.

Figure 1:
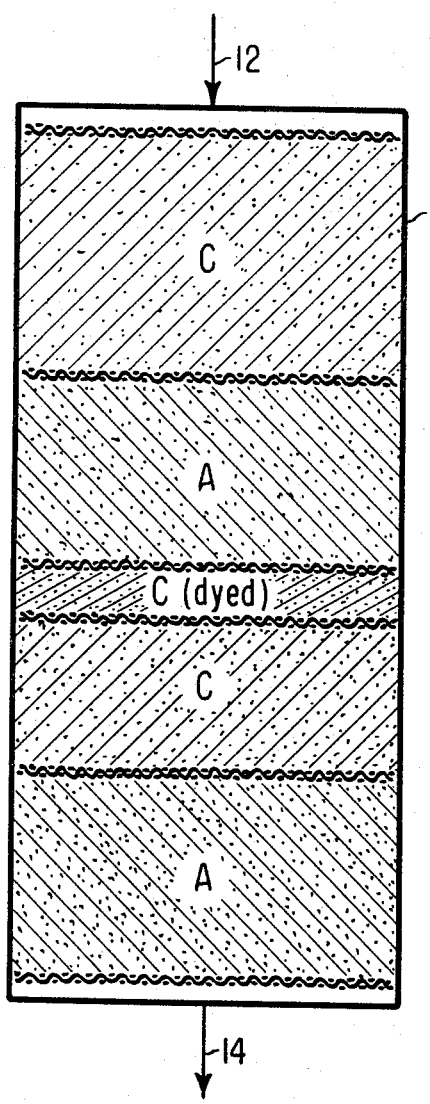
FIG. 1 is a schematic elevation in cross section showing one embodiment of this invention.
Figure 2:
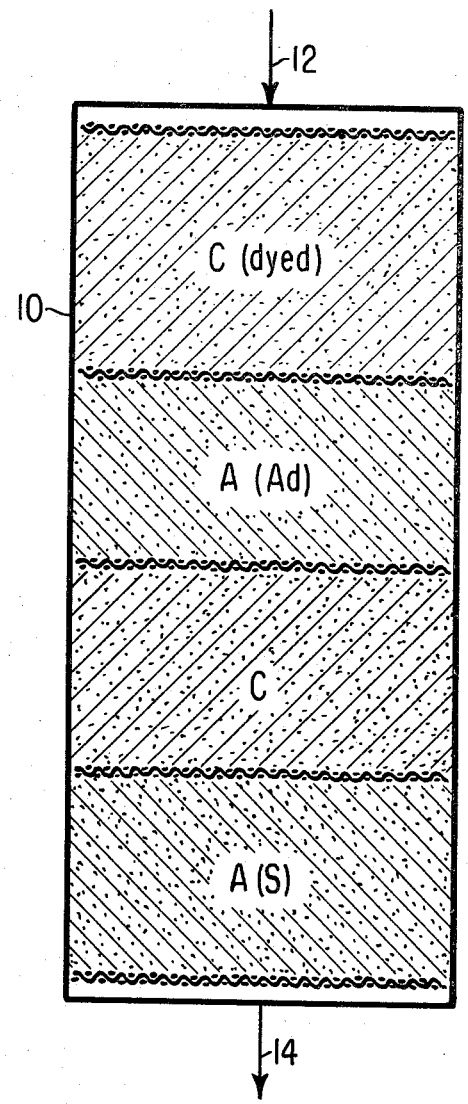
FIG. 2 is a schematic elevation in cross section showing another embodiment.

FIGS. 1 and 2 illustrate ion exchangers employing multiple alternate layers of cation exchange resin C, anion exchange resin A, cation exchange resin C, and anion exchange resin A.

In FIG. 1 only the upper stratum of the second layer of cation exchange resin is dyed, with the boundary between dyed and undyed resin being located where color change will occur at the desired end point of operations for particular demineralization conditions. Thus the boundary between dyed and undyed resin gives a clear and unambiguous end point, as the beginning and end of the color change transition through the dyed stratum is indicated quite sharply, and the operator will not be tempted to squeeze through a little more water because of the obvious presence of more apparently unexhausted resin downstream from the dyed stratum.

In the embodiment of FIG. 2, the uppermost layer is a dyed cation exchange resin C(Dyed), followed by a layer of an acid absorbing anion exchange resin A(Ad), a second layer of cation exchange resin (not dyed) C, and finally a layer of a strongly basic anion exchange resin A(S). This arrangement is particularly useful when treating water containing alkali metal salts of strong acids, e.g., NaCl or $Na_2SO_4$, and provides for a color change in the upper layer when electrolyte first breaks through in the effluent. If the uppermost layer of anion exchange resin were, instead, a strongly basic anion exchange resin, electrolyte would often appear in the effluent before any of the cation exchange resin had changed color.

Alternatively, similar beneficial results may be obtained by placing a layer of strongly basic anion exchange resin immediately beneath the layer of acid adsorbing resin. Such a system would comprise an upper layer of strongly acid cation exchange resin, a second layer composed of an upper stratum of acid adsorbing resin and lower stratum of strongly basic anion exchange resin, then a third layer of the cation exchange resin and a fourth layer of the strongly basic anion exchange resin.

The dyed cation resin should be in the first layer, either making up the entire layer, or occupying a stratum located at the dye-change level at breakthrough.

In these embodiments the layer of acid adsorbing resin appears to isolate the adjacent dyed cation exchange resin from the acids formed during cation exchange, so that better color change indication of exhaustion is obtained.

The effectiveness of the novel arrangements described above are brought out by the following examples of actual operations in which the bed of ion exchange resin was contained in a cylinder 16 inches long and 4 inches in diameter, having an inlet at the top and an outlet at the bottom. In multibed operations each bed layer was about 4 inches high.

The following resins were used:

Strongly acid cation exchange resin-National Aluminate HCR-W, a sulfonated cross-linked styrene resin, in the hydrogen form, dyed with 4-phenylazodiphenylamine which changes from purple to orange at a pH of from 1.2 to 2.5, designated herein as C(-D).

Strongly basic anion exchange resin-National Aluminate SBR-P, a quaternary ammonium salt of an aminated cross-linked styrene resin, in the hydroxyl form, designated herein as A(S).

Moderately basic anion exchange resin-Diamond Alkali Co. Duolite A-30, a cross-linked polyalkyleneamine resin containing tertiary amino and quaternary ammonium groups in the hydroxyl form, designated herein as A(M).

Acid adsorbing anion exchange resin-Diamond Alkali Co. Duolite A-6 a porous opaque phenol formaldehyde condensation product having active tertiary amino groups, in the hydroxyl form, designated herein as A(Ad).

The following demineralization systems were set up:

(1) One bed (16') of C(D)
(2) Four layers, from top to bottom:

$$C(-D): A(M) \ C(-D): A(M)$$

(3) Four layers, from top to bottom:

$$C(-D): A(Ad): C(-D): A(S)$$

(4) Four layers, from top to bottom:

$$C(-D): A(S): C(-D): A(S)$$

to treat the following types of water:

(A) Boston tap water
(B) Water containing 200 p.p.m. NaCl
(C) Water containing 200 p.p.m. NaHCO$_3$
(D) Water containing 200 p.p.m. Na$_2$SO$_4$
(E) Water containing 200 p.p.m. CaCl$_2$
(F) Water containing 200 p.p.m. MgSO$_4$
(G) Water containing 200 p.p.m., mixture by weight ⅓ Na$_2$SO$_4$, ⅓ CaCl$_2$, ⅓ NaHCO$_3$
(H) Water containing 400 p.p.m. of mixture by weight ⅓ Na$_2$SO$_4$, ⅓ CaCl$_2$, ⅓ NaHCO$_3$ Table I sets forth the amount of salt removed, the amount of water processed, and the depth of the color change (through cation resin only) when the effluent water had a resistance of 50,000 ohms/cm. (except in the case of bed No. 1, for which the end point was taken as the point when the pH of the effluent rose to 3.8).

TABLE I

| System | | Level of Color Change, inches from top through Cs | Gallons of water treated | Grains of solids removed |
|---|---|---|---|---|
| Series A—Boston Tap Water. | 1 | 15.7 | 2,525 | 3,790 |
| | 2 | 3.2 | 960 | 1,440 |
| | 3 | 1.9 | 611.5 | 919 |
| | 4 | 0 | 830 | 1,242 |
| Series B—200 p.p.m. NaCl. | 1 | 12 | 240 | 2,810 |
| | 2 | 0.5 | 57 | 668 |
| | 3 | 2 | 62 | 726 |
| | 4 | 0 | 55.4 | 649 |
| Series C—200 p.p.m. NaHCO$_3$. | 1 | 15.7 | 231 | 2,700 |
| | 2 | 5.2 | 111.5 | 1,305 |
| | 3 | 6 | 200 | 2,340 |
| | 4 | 5.9 | 142.8 | 1,670 |
| Series D—200 p.p.m. Na$_2$SO$_4$. | 1 | 11.5 | 223 | 2,610 |
| | 2 | 4.8 | 68 | 795 |
| | 3 | 4 | 111 | 1,300 |
| | 4 | 0 | 93 | 1,190 |
| Series E—200 p.p.m. CaCl$_2$. | 1 | 14.2 | 278 | 3,250 |
| | 2 | 4 | 80.5 | 940 |
| | 3 | 2 | 65.5 | 765 |
| | 4 | 4 | 55.5 | 650 |
| Series F—200 p.p.m. MgSO$_4$. | 1 | 13 | 130.5 | 1,530 |
| | 2 | 4 | 61 | 715 |
| | 3 | 4.5 | 118 | 1,380 |
| | 4 | 4.9 | 82.5 | 970 |
| Series G—200 p.p.m. Na$_2$SO$_4$; NaHCO$_3$; CaCl$_2$. | 1 | 11.5 | 193.5 | 2,260 |
| | 2 | 6 | 136 | 1,590 |
| | 3 | 4 | 92 | 1,075 |
| | 4 | 3.5 | 78 | 910 |
| Series H—400 p.p.m. Na$_2$SO$_4$; NaHCO$_3$; CaCl$_2$. | 1 | 12 | 92.25 | 2,160 |
| | 2 | 3.5 | 42 | 994 |
| | 3 | 4.9 | 66.5 | 1,560 |
| | 4 | 3.5 | 35.5 | 830 |

In the operation of the small mixed bed exchange demineralizers reported above the break-through of salt-containing water was found to occur long before the bed was entirely exhausted of ion exchange capacity. This was particularly true with univalent alkali metal salts of strong acids (NaCl and Na$_2$SO$_4$), the cations of which do not become strongly attached to the resin. Sodium chloride and sulfate, for instance, under certain conditions would appear at the outlet of the resin bed even before the cation exchange resin at the inlet end has become entirely depleted (as shown by a color change), see B-4 and D-4.

The extent to which a bed would permit salt throughput before the resin at the inlet end changes color, varied with the nature and arrangement of the anion exchange resins. The strongly basic anion exchange resins (containing quaternary ammonium groups) when used in combination with strongly acid cation exchange resins (containing sulfonic acid groups) will pass water of 50,000 ohm/cm. resistivity (containing the equivalent of 10 p.p.m. sodium chloride) before any color change was indicated, whereas with a less basic resin a definite color change would occur at the inlet end by the time the 50,000 ohm/cm. end point was reached. Compare B-2 and B-3 with B-4, and D-2 and D-3 with D-4.

This effect is curious, since a bed consisting entirely of the cation exchange resin will change color for about 75% of its length (from inlet toward outlet) by the time the 10 p.p.m. end is reached, see B-1 and D-1.

The early exhaustion effect is accordingly at least partially dependent on the nature and arrangement of the anion exchange resins used with the strongly acid cation exchange resin.

Another factor was the nature of the anion present. The early breakthrough effect was most marked when salts of strong highly ionized acids are present, which suggests perhaps that the presence of strong acids capable of reversibly regenerating the resin may partially account for the failure of the cation resin thoroughly to remove the sodium, through an auto regeneration phenomenon.

With salts of weak acids, e.g., bicarbonates, a far greater volume of resin would change color at the breakthrough point, particularly when the anion exchange resin was of the weakly basic (acid adsorbent) type, C-3 with C-4, G-2 and G-3 with G-4, and H-3 with H-4. Such resins do not pick up bicarbonates or carbonic acid, whose presence in low concentration do not lower the pH or produce too high a resistance. Strongly basic anion exchange resins on the other hand, may tend to remove and retain carbonic acid until it is displaced by other anions at which time it comes through in relatively high concentration sufficient to produce low pH and low resistance. As the resulting effluent has then become quite impure an end point is indicated.

The ion exchange systems embodying this invention accordingly provide a heretofore unattained reliability in indicating the end point at which substantially demineralized water is no longer being produced. Suitable resins include, in addition to those specifically described above, the other well known strongly acid cation exchange resins (having a dissociate constant of greater than $10^{-3}$), acid adsorbing anion exchange resins (having a dissociate constant of less than $10^{-5}$), and strongly basic anion exchange resins (having a dissociate constant of greater than $10^{-3}$).

Other dyes than that herein described are also well known and may be employed, as is shown by U.S. Patents Nos. 2,761,833; 2,749,307; 2,781,312; 2,778,798, and 2,751,081.

In addition although best results have been attained utilized dyed cation exchange resins, the same principles are applicable to anion exchange resins, the dyeing of which is however more difficult. Modifications of this type will readily occur to men skilled in the art and familiar with the technology herein disclosed, and may be made without departing from the scope of this invention.

This invention has been described with specific reference to the treatment of water; however it is also applicable to the demineralization of aqueous mixtures, e.g. water and ethylene glycol or other water-miscible organic materials, and the designation of water in the claims should be taken as including such mixtures.

Having thus disclosed my invention and described in detail preferred embodiments thereof, I claim and desire to secure by Letters Patent:

1. An ion exchanger for demineralizing water comprising a container having an inlet and an outlet and containing a bed comprising a first layer of cation exchange resin adjacent to the inlet, a second layer of anion exchange resin adjacent to said first layer, a third layer of cation exchange resin adjacent to said second layer, and a fourth layer of anion exchange resin between said third bed and said outlet, said cation exchange resin in said first and third layers having a dissociation constant of at least $10^{-3}$, a portion thereof other than that adjacent to the fourth layer being dyed with an indicator which will change color upon substantial exhaustion of the ion exchange capacity of said resin, the portion thereof adjacent to the fourth layer being undyed.

2. An ion exchanger for demineralizing water comprising a container having an inlet and an outlet and containing a bed comprising a first layer of cation exchange resin adjacent to the inlet, a second layer of anion exchange resin adjacent to said first layer, a third layer of cation exchange resin adjacent to said second layer, and a fourth layer of anion exchange resin between said third bed and said outlet, said cation exchange resin in said first and third layers having a dissociation constant of at least $10^{-3}$, a portion thereof other than that adjacent to the fourth layer being dyed with an indicator which will change color upon substantial exhaustion of the ion exchange capacity of said resin, the portion thereof adjacent to the fourth layer being undyed, the second layer being an acid adsorbing anion resin having a dissociation constant less than $10^{-5}$ and the fourth layer being a strongly basic anion exchange resin having a dissociation constant greater than $10^{-3}$.

3. An ion exchanger as defined by claim 2 wherein the portion of dyed resin comprises a stratum.

4. An ion exchanger as defined by claim 2 wherein the portion of dyed resin is a stratum within the third layer adjacent to the second layer.

5. An ion exchanger for demineralizing water comprising a container having an inlet and an outlet and containing a bed comprising a first layer of cation exchange resin adjacent to the inlet, a second layer of anion exchange resin adjacent to said first layer, a third layer of cation exchange resin adjacent to said second layer, and a fourth layer of anion exchange resin between said third bed and said outlet, said cation exchange resin in said first and third layers having a dissociation constant of at least $10^{-3}$, a portion thereof adjacent to the inlet being dyed with an indicator which will change color upon substantial exhaustion of the ion exchange capacity of said resin, the portion thereof adjacent to the fourth layer being undyed, the second layer being an acid adsorbing anion resin having a dissociation constant less than $10^{-5}$ and the fourth layer being a strongly basic anion exchange resin having a dissociation constant greater than $10^{-3}$.

6. In an ion exchanger for demineralizing water which comprises a first layer of cation exchange resin and a second layer of anion exchange resin, and means for flowing water through said layers in contact with said resins, the improvement comprising providing a cation exchange resin dyed with a color indicator which will change color upon substantial exhaustion of the ion exchange capacity of said cation exchange resin in at least a stratum of said first layer and providing an acid adsorbing resin in said second layer in a second stratum nearest said first layer and providing a strongly basic anion exchange resin beyond said second stratum.

References Cited

UNITED STATES PATENTS

| | | | |
|---|---|---|---|
| 2,525,497 | 10/1950 | Monfried | 210—290 |
| 2,749,307 | 6/1956 | Ellison | 210—94 |
| 2,763,607 | 9/1956 | Staverman | 210—290 |
| 2,778,798 | 1/1957 | Klumb et al. | 210—94 X |
| 3,172,037 | 3/1965 | Pfeiffer | 210—85 X |
| 3,176,844 | 4/1965 | Nelson | 210—96 |
| 3,178,901 | 4/1965 | Blackett | 210—96 |

REUBEN FRIEDMAN, *Primary Examiner.*

SAMIH N. ZAHARNA, *Examiner.*

J. ADEE, *Assistant Examiner.*